(12) United States Patent
Li

(10) Patent No.: US 10,484,655 B2
(45) Date of Patent: Nov. 19, 2019

(54) GATE DRIVING CIRCUIT AND DISPLAY DEVICE

(71) Applicant: Wuhan China Star Optoelectronics Technology Co., Ltd., Wuhan, Hubei (CN)

(72) Inventor: Yafeng Li, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 222 days.

(21) Appl. No.: 15/327,301

(22) PCT Filed: Dec. 30, 2016

(86) PCT No.: PCT/CN2016/113410
§ 371 (c)(1),
(2) Date: Sep. 4, 2017

(87) PCT Pub. No.: WO2018/119993
PCT Pub. Date: Jul. 5, 2018

(65) Prior Publication Data
US 2018/0338121 A1 Nov. 22, 2018

(30) Foreign Application Priority Data
Dec. 27, 2016 (CN) .......................... 2016 1 1228518

(51) Int. Cl.
*H04N 9/30* (2006.01)
*G02F 1/1345* (2006.01)
*G09G 3/36* (2006.01)

(52) U.S. Cl.
CPC ........... *H04N 9/30* (2013.01); *G02F 1/13454* (2013.01); *G09G 3/3677* (2013.01); *G09G 2310/0264* (2013.01)

(58) Field of Classification Search
None
See application file for complete search history.

(56) References Cited

U.S. PATENT DOCUMENTS

| 8,830,156 | B2 * | 9/2014 | Kim | ..................... G09G 3/3677 345/100 |
| 2015/0043703 | A1 * | 2/2015 | Tan | ........................ G11C 19/28 377/68 |

(Continued)

FOREIGN PATENT DOCUMENTS

| CN | 104318883 A | 1/2015 |
| CN | 104376826 A | 2/2015 |

(Continued)

OTHER PUBLICATIONS

Chinese Office Action for related Chinese Application No. 201611228518.6; action dated Sep. 23, 2018; (4 pages).

(Continued)

*Primary Examiner* — Minh D A
*Assistant Examiner* — James H Cho

(57) ABSTRACT

Disclosed is a gate driving circuit and a display device, which solve the technical problem that the prior art is easy to cause abnormal output of gate driving signals. The gate driving circuit includes a precharge unit circuit, an output unit circuit, and a holding unit circuit. The output unit circuit includes a first reference point and a clock signal line. The holding unit circuit includes a second reference point and a holding signal line, and a holding capacitor is connected between the second reference point and the holding signal line.

15 Claims, 3 Drawing Sheets

(56) References Cited

U.S. PATENT DOCUMENTS

2015/0302934 A1* 10/2015 Qi .................. G11C 19/184
　　　　　　　　　　　　　　　　377/54
2016/0071614 A1* 3/2016 Lee .................. G09G 5/006
　　　　　　　　　　　　　　　　345/214

FOREIGN PATENT DOCUMENTS

| CN | 105976775 A | 9/2016 |
| CN | 106098002 A | 11/2016 |
| CN | 106128379 A | 11/2016 |
| JP | 2012215889 A | 11/2012 |

OTHER PUBLICATIONS

International Search Report and Written Opinion for related International Application No. PCT/CN2016/113410; report dated Sep. 4, 2017; (13 pages).

* cited by examiner

GATE DRIVING CIRCUIT AND DISPLAY DEVICE

CROSS-REFERENCE TO RELATED APPLICATIONS

This application claims the priority of Chinese patent application CN201611228518.6, entitled "Gate driving circuit and display device" and filed on Dec. 27, 2016, the entirety of which is incorporated herein by reference.

FIELD OF THE INVENTION

The present disclosure relates to the technical field of display technology, and in particular, to a gate driving circuit and a display device.

BACKGROUND OF THE INVENTION

With the development of display technologies, liquid crystal display LCD) devices have become the most common display devices. LCD displays have the advantages of high space utilization, low power consumption, no radiation, and low electromagnetic interference etc., and therefore are widely used in information communication tools, such as TVs, cell phones, and tablet computers.

At present, the Gate Driver On Array (GOA) technology has been more and more widely applied in LCD display devices. GOA means that a gate driving circuit of scan lines is manufactured on an array substrate by using the existing thin film transistor process, to realize progressive scanning of scan lines.

As shown in FIGS. 1 and 2, in an existing GOA gate driving circuit, in order to ensure the stability of an output point Gn of a scan line, two reference points Q, P are introduced, and Q. P are configured to influence each other. After Gn outputs a high level scanning signal, Gn needs to be in a stable low level phase. When a clock signal CKV3 is at a high level, a high-level signal line VGH charges the point P to a high level which is maintained through a capacitor C2. When the point P is at a high level, T4 and T5 are in a turn-on state, so as to ensure the stability of a low level at points Gn and Q. It can be seen that when the point Q attains a low level, the point P would be at a high level in a frame time. That is, T4 and T5 keep a turn-on state. However, long time working may lead to a potential shift of the two key thin film transistors (TFT), reduce the stability of the circuit, and result in abnormal output of a gate driving signal.

SUMMARY OF THE INVENTION

The present disclosure is to provide a gate driving circuit and a display device, so as to solve the technical problem that abnormal output of gate driving signals is easily caused in the prior art.

The present disclosure provides a gate driving circuit, comprising a precharge unit circuit, an output unit circuit, and a holding unit circuit. The output unit circuit includes a first reference point and a clock signal line. The holding unit circuit includes a second reference point and a holding signal line. A holding capacitor is connected between the second reference point and the holding signal line. Before an output period, the precharge unit circuit outputs a high level to the first reference point. During the output period, the first reference point is maintained at a high level, and the clock signal line outputs a high level to cause the output unit circuit to output a scanning signal to a scan line. After the output period, the holding signal line outputs a periodic high level to the second reference point through the holding capacitor, and the first reference point is maintained at a low level.

Preferably, the precharge unit circuit includes a first switch tube and a high-level signal line. A gate of the first switch tube is connected to the previous-stage scan line, a source thereof is connected to the high-level signal line, and a drain thereof is connected to the first reference point.

Further, the precharge unit circuit further includes a second switch tube. A gate of the second switch tube is connected to a next-stage scan line, a source thereof is connected to the high-level signal line, and a drain thereof is connected to the first reference point.

Further, the output unit circuit further includes a third switch tube and a first capacitor. A gate of the third switch tube is connected to the first reference point, a source thereof is connected to the clock signal line, and a drain thereof is connected to the scan line. The first capacitor is connected between the gate and the drain of the third switch tube.

Preferably, the holding unit circuit further includes a low-level signal line, a forth switch tube, and a second capacitor. A gate of the forth switch tube is connected to the second reference point, a source thereof is connected to the low-level signal line, and a drain thereof is connected to the scan line. The second capacitor is connected between the second reference point and the low-level signal line.

Further, the holding unit circuit further includes a fifth switch tube. A gate of the fifth switch tube is connected to the second reference point, a source thereof is connected to the first reference point, and a drain thereof is connected to the low-level signal line.

Further, the holding unit circuit further includes a sixth switch tube. A gate of the sixth switch tube is connected to the first reference point, a source thereof is connected to the second reference point, and a drain thereof is connected to the low-level signal line.

Preferably, a duty cycle of the periodic high level of the holding signal line output is 25% or 50%.

The present disclosure further provides a display device comprising a plurality of the cascaded gate driving circuits.

Preferably, the display device includes an array substrate, and the gate driving circuit is formed on the array substrate.

The present disclosure has the following beneficial effects. The gate driving circuit provided by the present disclosure comprises a precharge unit circuit, an output unit circuit, and a holding unit circuit. Before the output period, the precharge unit circuit outputs a high level to the first reference point in the output unit circuit. During the output period, the first reference point is maintained at a high level, and the clock signal line outputs a high level to cause the output unit circuit to output a scanning signal to the scan line. After the output period, the holding signal line in the holding unit circuit outputs a periodic high level to the second reference point through the holding capacitor, so that the first reference point is maintained at a low level. When the holding signal line is at a high level, the second reference point is self-raised to a high level to maintain the stability of the first reference point and the scan line; when the holding signal line is of a low level, the second reference point is bootstrapped to a low level, so as to prevent the potential shift of the thin film transistor in the holding unit circuit due to long-time turn-on thereof, thereby solving the technical problem that the prior art is likely to cause abnormal output of the gate driving signal.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments are introduced briefly below to illustrate the technical solutions of the embodiments of the present disclosure more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

Embodiment 1

Figure 1:
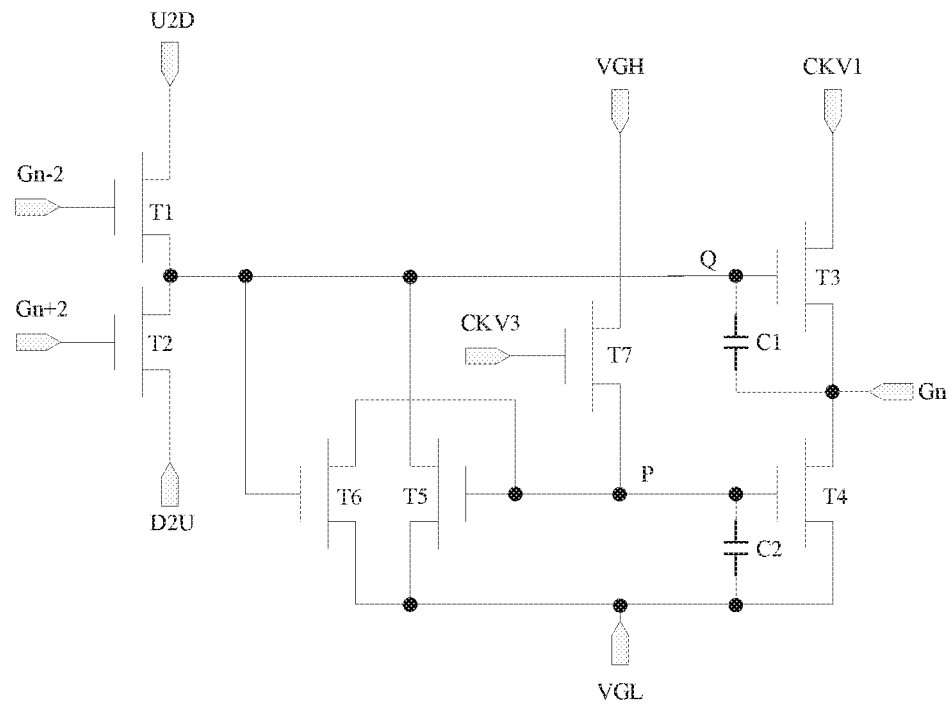
FIG. 1 is a schematic diagram of an existing gate driving circuit.
Figure 2:
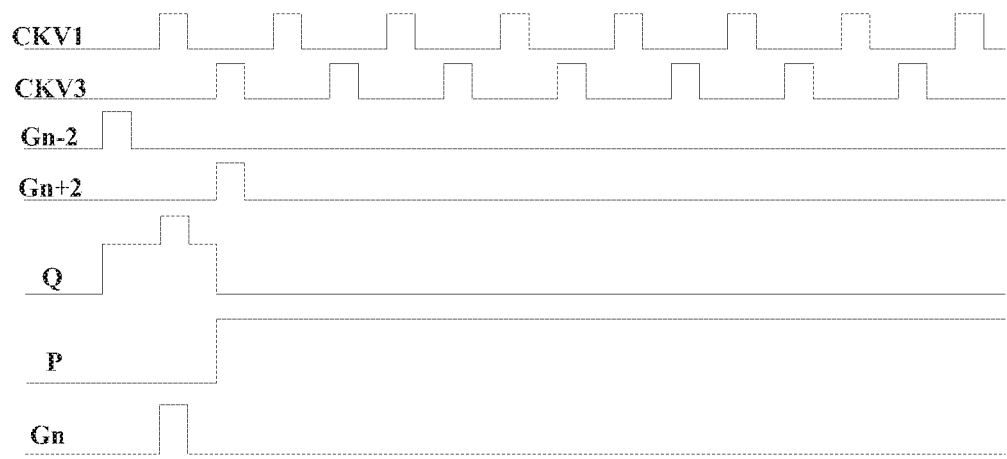
FIG. 2 is a timing diagram of an existing gate driving circuit.
Figure 3:
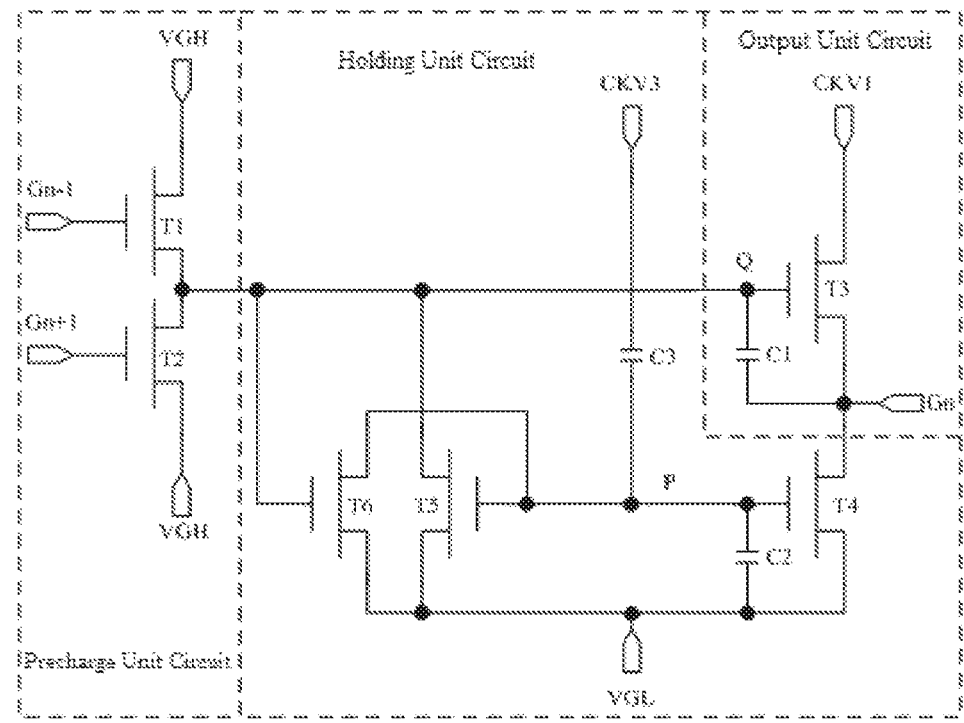
FIG. 3 is a schematic diagram of a gate driving circuit provided by the embodiment 1 of the present disclosure.

As shown in FIG. 3, the present embodiment provides a gate driving circuit, comprising a precharge unit circuit, an output unit circuit, and a holding unit circuit. The output unit circuit includes a first reference point Q and a clock signal line CKV1. The holding unit circuit includes a second reference point P and a holding signal line CKV3, and a holding capacitor C3 is connected between the second reference point P and the holding signal line CKV3.

Before an output period, the precharge unit circuit outputs a high level to the first reference point Q. During the output period, the first reference point Q is maintained at a high level, and the clock signal line CKV1 outputs a high level to cause the output unit circuit to output a scanning signal to a scan line Gn. After the output period, the holding signal line CKV3 outputs a periodic high level to the second reference point P through the holding capacitor C3, so that the first reference point Q is maintained at a low level. An output period means a scanning period during which the scanning line Gn controlled by a current-stage gate driving circuit outputs a scanning signal.

In the present embodiment, the precharge unit circuit may specifically includes a first switch tube T1 and a high-level signal line VGH. A gate of the first switch tube T1 is connected to a previous-stage scan line Gn−1, a source thereof is connected to the high-level signal line VGH, and a drain thereof is connected to the first reference point Q. When the previous-stage scan line Gn−1 outputs a scanning signal, the first switch T1 is turned on so that the high-level signal line VGH precharges the output unit circuit through the first switch T1.

The precharge unit circuit may further include a second switch tube T2. A gate of the second switch tube T2 is connected to a next-stage scan line Gn+1, a source thereof is connected to the high-level signal line VGH, and a drain thereof is connected to the first reference point Q. When the next-stage scan line Gn+1 outputs a scanning signal, the output unit circuit can be precharged through the second switch tube T2 to realize bidirectional scanning.

Further, the output unit circuit also includes a third switch tube T3 and a first capacitor C1. A gate of the third switch tube T3 is connected to the first reference point Q, a source thereof is connected to the clock signal line CKV1, and a drain thereof is connected to the scan line Gn. The first capacitor C1 is connected between the gate and the drain of the third switch tube T3.

As a preferred embodiment, the holding unit circuit also includes a low level signal line VGL, a forth switch tube T4, and a second capacitor C2. A gate of the forth switch tube T4 is connected to the second reference point P, a source thereof is connected to the low-level signal line VGL, and a drain thereof is connected to the scan line Gn. The second capacitor C2 is connected between the second reference point P and the low-level signal line VGL.

In the present embodiment, the holding unit circuit also includes a fifth switch tube T5. A gate of the fifth switch tube T5 is connected to the second reference point P, a source thereof is connected to the first reference point Q, and a drain thereof is connected to the low-level signal line VGL.

Further, the holding unit circuit also includes a sixth switch tube T6. A gate of the sixth switch tube T6 is connected to the first reference point Q, a source thereof is connected to the second reference point P, and a drain thereof is connected to the low-level signal line VGL.

Figure 4:
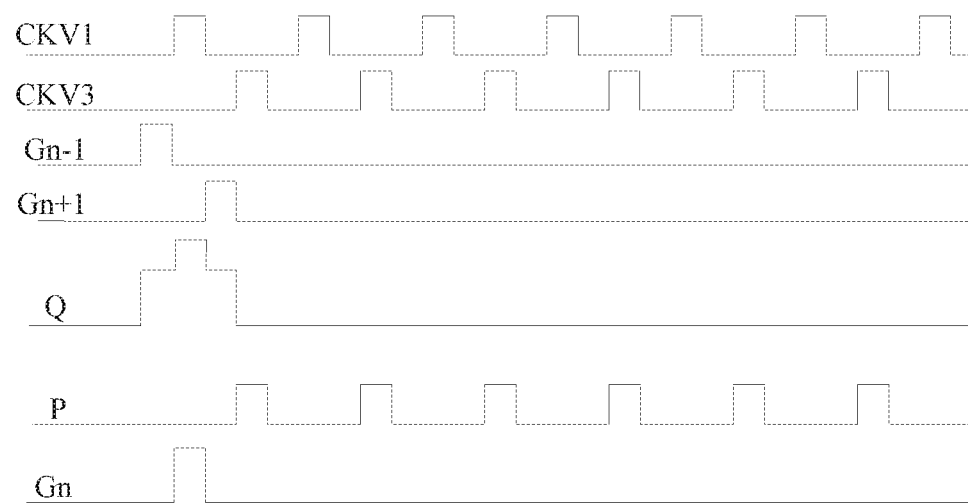
FIG. 4 is a timing diagram of the gate driving circuit provided by the embodiment 1 of the present disclosure.

As shown in FIG. 4, in the present embodiment, a duty cycle of the periodic high level outputted by the holding signal line CKV3 is 25%. Similar to the clock signal line CKV1, the holding signal line CKV3 also outputs a clock signal with a duty cycle of 25%, but the clock signals outputted by CKV1 and CKV3 are out of phase with each other by a half period.

As shown in FIGS. 3 and 4, the gate driving circuit provided by the present embodiment includes the following working stages.

In Stage 1, precharge is conducted. In the present embodiment, a forward scanning is described as an example. Gn−1 outputs a high-level scanning signal, T1 is turned on, and the point Q is precharged to a high level.

In Stage 2, a high level is outputted by Gn. In stage 1, the point Q is precharged to a high level. C1 can maintain the high level for the point Q, so that T3 is turned on. At the same time, the high level of CKV1 is outputted to Gn through T3, so that Gn outputs the scanning signal. In addition, T6 is turned on at the moment, so that the point P is maintained at a low level.

In Stage 3, a low level is outputted by Gn. Gn+1 outputs a high level, T2 is turned on, and the point Q is maintained a high level. In this case, the low level of CKV1 is outputted to Gn through T3, so that Gn outputs a low level.

In Stage 4, the point Q is pulled down to a low level. CKV3 outputs a high level, and the point P is pulled up to a high level through a bootstrapping effect of C3. At the moment, T5 is turned on, and the point Q is pulled down, so that T3 is turned off. Meanwhile, T4 is turned on, and Gn is also pulled down.

In Stage 5, the point Q and the point Gn are maintained at low levels. When the point Q attains a low level, T6 is turned off. When CKV3 is at a high level, the point P is bootstrapped to a high level through C3, thereby maintaining low levels of Q and Gn. When CKV3 is at a low level, the point Q is bootstrapped to a low level through C3, which prevents potential shifts of T3 and T4 caused by long-time turn-on thereof, thereby solving the technical problem that the prior art is easy to cause abnormal output of the gate driving signal.

Embodiment 2

Figure 5:
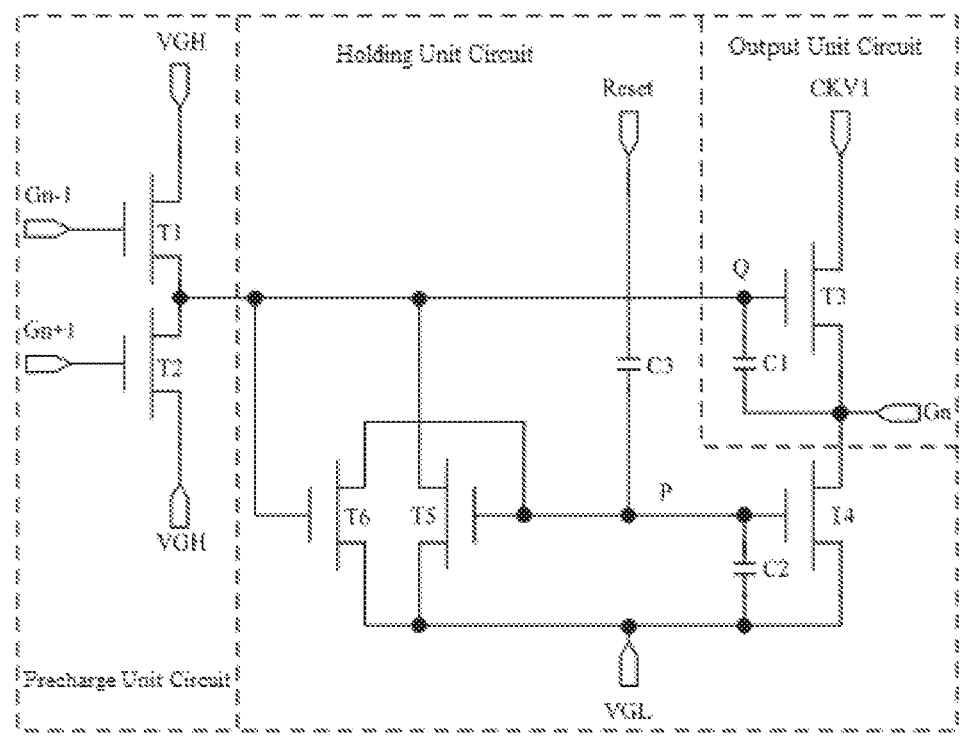
FIG. 5 is a schematic diagram of a gate driving circuit provided by the embodiment 2 of the present disclosure.
Figure 6:
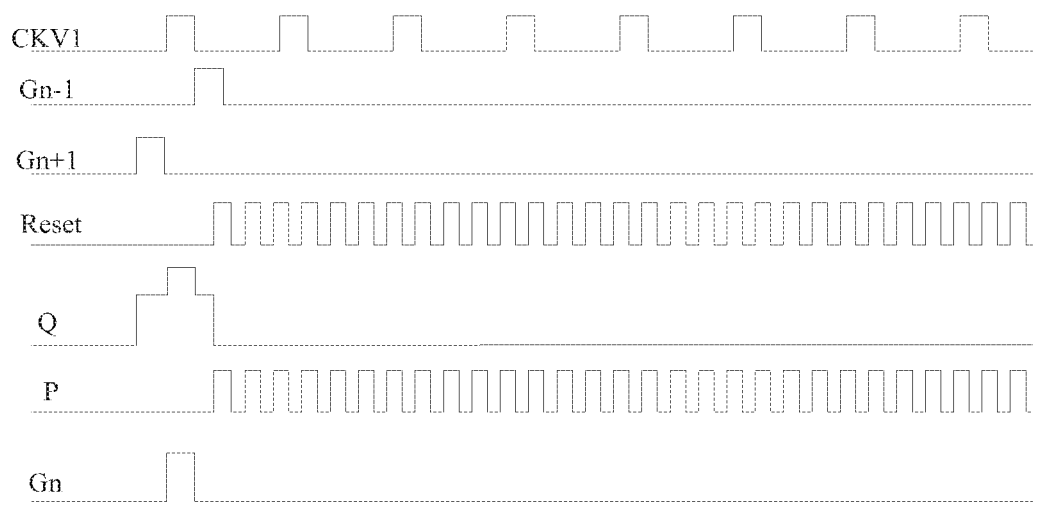
FIG. 6 is a timing diagram of the gate driving circuit provided by the embodiment 2 of the present disclosure.

As shown in FIGS. 5 and 6, the present embodiment provides a gate driving circuit, comprising a precharge unit circuit, an output unit circuit, and a holding unit circuit. Structure of each of the unit circuits in this embodiment is substantially the same as that of the embodiment 1, except that a duty cycle of a periodic high level outputted by a holding signal line Reset in this embodiment is 50%.

The gate driving circuit provided by the present embodiment includes the following working stages.

In Stage 1, precharge is conducted. In the present embodiment, a backward scanning is described as an example. Gn+1 outputs a high-level scanning signal, T2 is turned on, and the point Q is precharged to a high level.

In Stage 2, a high level is outputted by Gn. In stage 1, the point Q is precharged to a high level. C1 can maintain a high level for the point Q, so that T3 is turned on. At the same time, the high level of CKV1 is outputted to Gn through T3, so that Gn outputs the scanning signal. In addition, T6 is turned on at the moment, so that the point P is maintained at a low level.

In Stage 3, a low level is outputted by Gn. Gn−1 outputs a high level, T1 is in a conductive state, and the point Q is maintained at a high level. In the case, the low level of CKV1 is outputted to Gn through T3, so that Gn outputs a low level.

In Stage 4, the point Q is pulled down to a low level. Reset outputs a high level, and the point P is pulled up to a high level through bootstrap of C3. At the moment, T5 is turned on, and the point Q is pulled down, so that T3 is turned off. Meanwhile, T4 is turned on, and Gn is also pulled down.

In Stage 5, the point Q and the point Gn are maintained low levels. When the point Q attains a low level, T6 is turned off. When Reset is at a high level, the point P is bootstrapped to a low level through C3, thereby maintaining low levels of Q and Gn. When Reset is at a low level, the point P is bootstrapped to a low level through C3, which prevents potential shifts of T3 and T4 caused by long-time turn-on thereof, thereby solving the technical problem that the prior art is easy to cause abnormal output of the gate driving signal.

Embodiment 3

The present disclosure provides a display device comprising a plurality of cascaded gate driving circuits provided by the two embodiments described above.

The display device provided by the present embodiment comprises an array substrate and the gate driving circuit is formed on the array substrate. That is, the gate driving circuit is manufactured in a half region of the array substrate by using the GOA technique.

The display device provided by the present embodiment of the present disclosure has the same technical features as the gate driving circuits provided in the embodiment 1 and embodiment 2 described above. Therefore, the same technical problem can be solved to achieve the same technical effect.

The above embodiments are described only for better understanding, rather than restricting the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A gate driving circuit, comprising a precharge unit circuit, an output unit circuit, and a holding unit circuit, wherein:
    the output unit circuit comprises a first reference point and a clock signal line;
    the holding unit circuit comprises a second reference point and a holding signal line, and a holding capacitor is connected between the second reference point and the holding signal line;
    before an output period, the precharge unit circuit outputs a high level to the first reference point;
    during the output period, the first reference point is maintained at a high level, and the clock signal line outputs a high level to cause the output unit circuit to output a scanning signal to a scan line;
    after the output period, the holding signal line outputs a periodic high level to the second reference point through the holding capacitor, so that the first reference point is maintained at a low level;
    wherein the holding unit circuit further comprises a low-level signal line, a fourth switch tube, and a second capacitor, wherein a gate of the fourth switch tube is connected to the second reference point, a source thereof is connected to the low-level signal line, and a drain thereof is connected to the scan line; and wherein the second capacitor is connected between the second reference point and the low-level signal line.

2. The gate driving circuit according to claim 1, wherein, the precharge unit circuit comprises a first switch tube and a high-level signal line,
    wherein a gate of the first switch tube is connected to a previous-stage scan line, a source thereof is connected to the high-level signal line, and a drain thereof is connected to the first reference point.

3. The gate driving circuit according to claim 2, wherein, the precharge unit circuit further comprises a second switch tube,
    wherein a gate of the second switch tube is connected to a next-stage scan line, a source thereof is connected to the high-level signal line, and a drain thereof is connected to the first reference point.

4. The gate driving circuit according to claim 1, wherein, the output unit circuit also comprises a third switch tube and a first capacitor,
    wherein a gate of the third switch tube is connected to the first reference point, a source thereof is connected to the clock signal line, and a drain thereof is connected to a current-stage scan line; and
    wherein the first capacitor is connected between the gate and the drain of the third switch tube.

5. The gate driving circuit according to claim 1, wherein the holding unit circuit further comprises a fifth switch tube,
wherein a gate of the fifth switch tube is connected to the second reference point, a source thereof is connected to the first reference point, and a drain thereof is connected to the low-level signal line.

6. The gate driving circuit according to claim 5, wherein the holding unit circuit further comprises a sixth switch tube,
wherein a gate of the sixth switch tube is connected to the first reference point, a source thereof is connected to the second reference point, and a drain thereof is connected to the low-level signal line.

7. The gate driving circuit according to claim 1, wherein, a duty cycle of the periodic high level outputted by the holding signal line is 25% or 50%.

8. A display device, comprising a plurality of cascaded gate driving circuits each of which comprises a precharge unit circuit, an output unit circuit, and a holding unit circuit, wherein:
the output unit circuit comprises a first reference point and a clock signal line;
the holding unit circuit comprises a second reference point and a holding signal line, and a holding capacitor is connected between the second reference point and the holding signal line;
before an output period, the precharge unit circuit outputs a high level to the first reference point;
during the output period, the first reference point is maintained at a high level, and the clock signal line outputs a high level to cause the output unit circuit to output a scanning signal to a scan line;
after the output period, the holding signal line outputs a periodic high level to the second reference point through the holding capacitor, so that the first reference point is maintained at a low level;
where the holding unit circuit further comprises a low-level signal line, a fourth switch tube, and a second capacitor, wherein a gate of the fourth switch tube is connected to the second reference point, a source thereof is connected to the low-level signal line, and a drain thereof is connected to the scan line; and wherein the second capacitor is connected between the second reference point and the low-level signal line.

9. The display device according to claim 8, wherein, the precharge unit circuit comprises a first switch tube and a high-level signal line,
wherein a gate of the first switch tube is connected to a previous-stage scan line, a source thereof is connected to the high-level signal line, a drain thereof is connected to the first reference point.

10. The display device according to claim 9, wherein, the precharge unit circuit further comprises a second switch tube,
wherein a gate of the second switch tube is connected to a next-stage scan line, a source thereof is connected to the high-level signal line, and a drain thereof is connected to the first reference point.

11. The display device according to claim 8, wherein, the output unit circuit further comprises a third switch tube and a first capacitor,
wherein a gate of the third switch tube is connected to the first reference point, a source thereof is connected to the clock signal line, and a drain thereof is connected to the current-stage scan line; and
wherein the first capacitor is connected between the gate and the drain of the third switch tube.

12. The display device according to claim 8, wherein the holding unit circuit further comprises a fifth switch tube,
wherein a gate of the fifth switch tube is connected to the second reference point, a source thereof is connected to the first reference point, and a drain thereof is connected to the low-level signal line.

13. The display device according to claim 12, wherein, wherein the holding unit circuit further comprises a sixth switch tube,
wherein a gate of the sixth switch tube is connected to the first reference point, a source thereof is connected to the second reference point, and a drain thereof is connected to the low-level signal line.

14. The display device according to claim 8, wherein, a duty cycle of the periodic high level outputted by the holding signal line is 25% or 50%.

15. The display device according to claim 8, wherein, the display device comprises an array substrate, and the gate driving circuit is formed on the array substrate.

* * * * *